L. A. ASPINWALL.
PUMP FOR LIQUID SPRAYERS.
APPLICATION FILED JUNE 3, 1909.
994,558.
Patented June 6, 1911.
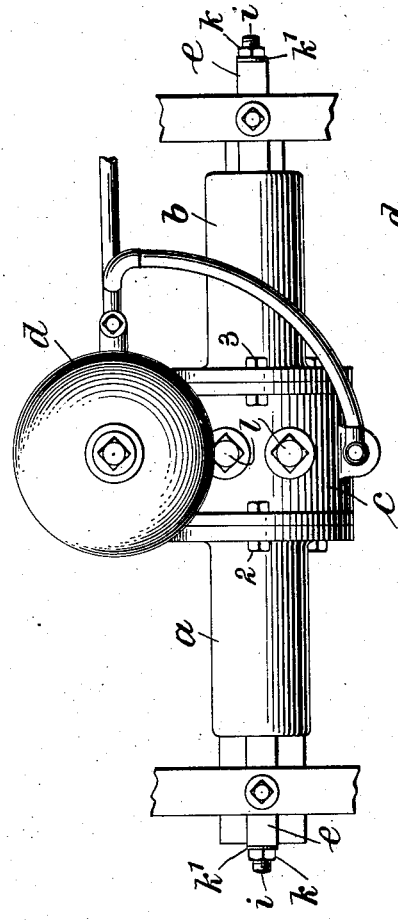
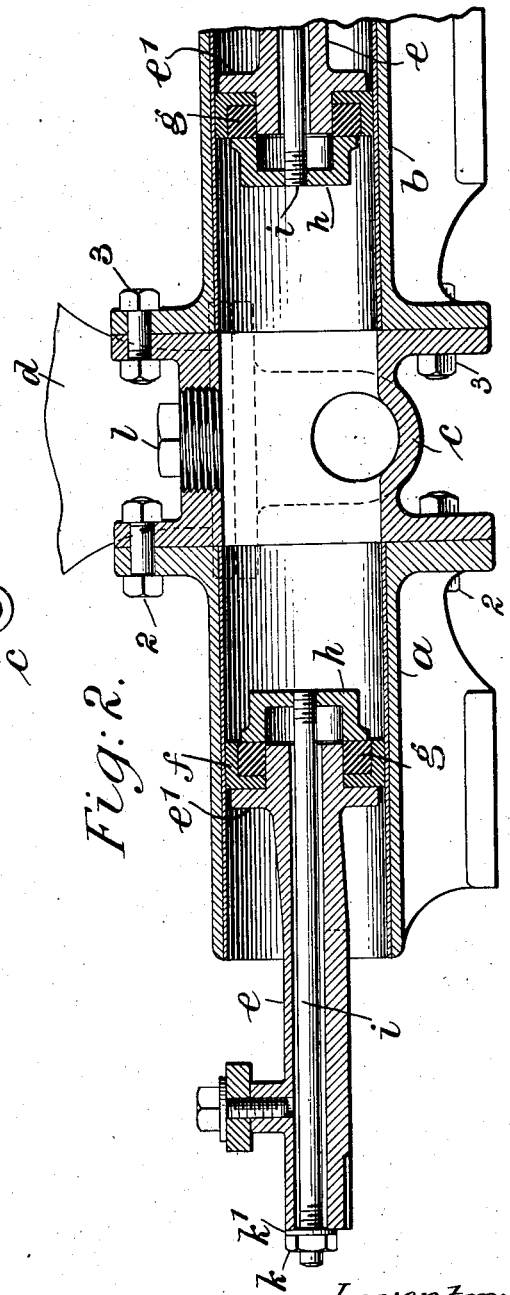
Witnesses:
Chas H Smith
A. D. Serrell
Inventor:
Lewis A. Aspinwall.
By Harold Serrell
his Attorney.

UNITED STATES PATENT OFFICE.

LEWIS AUGUSTUS ASPINWALL, OF JACKSON, MICHIGAN, ASSIGNOR TO ASPINWALL MANUFACTURING CO., OF JACKSON, MICHIGAN, A CORPORATION OF MICHIGAN.

PUMP FOR LIQUID-SPRAYERS.

994,558.  Specification of Letters Patent.  Patented June 6, 1911.

Application filed June 3, 1909. Serial No. 499,968.

*To all whom it may concern:*

Be it known that I, LEWIS AUGUSTUS ASPINWALL, a citizen of the United States, residing at Jackson, in the county of Jackson and State of Michigan, have invented an Improvement in Pumps for Liquid-Sprayers, of which the following is a specification.

In the use of liquid spraying devices particularly for treating potato blight, strong solutions are necessarily employed, which it has been found have a disastrous effect upon the piston packings of the pump used with the liquid spraying devices, particularly so while the pump is in a state of rest; for these strong solutions harden and warp the packings, having a shriveling effect thereon, or in other words, causing the same to shrink away from the cylinder, resulting in a leakage of the pump. This leakage makes necessary the removal of the piston and re-packing the same, all of which it is the object of my invention to relieve and make less frequent.

In the device of my invention the packing can be tightened up to prevent leakage without removing the piston from the cylinder or disconnecting any parts of the structure, and the renewal of the packing is readily and quickly accomplished.

The pump cylinder is open at one end and the piston preferably tubular and projecting. A cup-leather surrounds the inner end of the piston against a flange thereof. A rubber collar surrounds the same end of the piston and comes against the cup-leather. A rod passes through the tubular piston and I provide a hollow cup-shaped head bearing against the outer face of the rubber collar which is connected to one end of the rod and on the other end of the rod I provide a nut and washer which bear against the end of the tubular piston and by the tightening of which the head is forced against the rubber collar which is expanded, in turn expanding the piston outward against the inner surface of the cylinder and so effecting a tight joint of the packing against the inner surface of the cylinder. The desired extent of pressure is easily obtained and readily applied for the reason that the tightening up is on the exposed end of the tubular piston outside of the cylinder.

In the drawing, Figure 1 is a plan view generally illustrating the features of my invention, and Fig. 2 is a longitudinal and central section in large size showing the main portion illustrated in Fig. 1.

In the drawing, for the purpose of illustration, I have shown two cylinders and prefer in the device to which my invention is particularly adapted, to employ two cylinders although I do not limit myself in this respect as the particular features of the invention are applicable to a pump having only one cylinder as well as two cylinders in line.

$a, b$ represent the cylinders. These are illustrated as open-ended. The pistons each comprise a tubular stem part $e$ and a flange $e^1$ and tubular end. The tubular stem parts $e$ extend out beyond the open ends of the cylinders.

The piston-packing or cup-leather $f$ of any suitable or desired material is L-shaped as usual, it surrounds the tubular end of the piston with one side bearing against a face of the flange $e^1$ and against the inner surface of the cylinder. A rubber collar $g$ surrounds the tubular stem-end fitting the same and coming within the piston-packing or cup-leather $f$ and against the opposite side or surface thereof, and I provide a hollow cup-shaped head $h$ with a circumferential flange which agrees substantially in diameter with the rubber collar $g$ and which bears upon the outer end of the same. The inner diameter of this hollow cup-shaped head $h$ is fully as great as the tubular stem-end.

A rod $i$ extends through the tubular piston and the same at one end engages the head $h$ at an interiorly threaded central opening. This rod at the other end passes out of the end of the tubular piston and is provided with a nut $k$ and washer $k^1$ adapted to bear with force upon the end face of the tubular piston.

To expand the piston-packing or cup-leather $f$, the rubber collar $g$ within the same is expanded by drawing on the rod $i$ and head $h$ by tightening the nut $k$ at the outer and readily accessible end of the tubular sleeve $e$, and as the circular faces of the head $h$ and the rubber collar $g$ agree, these parts are directly acted upon by the tightening of the nut $k$ to expand the rubber collar and through it the piston-packing or cup-leather $f$ and make the pump fully operative.

I have shown in the drawing a central cylindrical body $c$ interposed between the open-ended cylinders *a b* and an air chamber *d*, and bolts 2 3 for connecting the parts at their respective flanges; this device being most suitable for employment in the different spraying devices such as I have shown and described in Letters Patent previously granted to me as follows:—No. 653,333, granted July 10, 1900; No. 717,314, granted December 30, 1902; No. 828,175, granted August 7, 1906 and No. 864,501, granted July 27, 1907. I have also shown screw plugs *l* in the center of the cylindrical body *c* providing access to the valves contained within this cylindrical body which however, are not shown and form no part of my present invention which relates particularly to the tubular piston, its cup-leather and means for expanding the same against the inner surface of the open-ended cylinder so as to provide a tight joint for pumping purposes.

I claim as my invention:

1. The combination with an open ended pump cylinder, of a piston comprising a tubular stem-part extending beyond the open end of the cylinder and having a flange near the inner end, a piston-packing of cup form surrounding the tubular stem between the flange and the inner end and bearing upon the flange, a rubber collar also surrounding this tubular stem within the piston-packing of cup form, a cup-shaped hollow head having a circumferential surface bearing against the outer face of the rubber collar, and means extending to the outer free end of the tubular stem part for applying pressure to expand the rubber collar and so expand the piston-packing.

2. The combination with an open ended pump cylinder, of a piston comprising a tubular stem-part extending beyond the open end of the cylinder and having a flange near the inner end, a piston-packing of cup form surrounding the tubular stem between the flange and the inner end and bearing upon the flange, a rubber collar also surrounding this tubular stem within the piston-packing of cup form, a cup-shaped hollow head having a circumferential surface bearing against the outer face of the rubber collar, and a rod passing through the tubular stem, at one end connected to said hollow head and at the other end extending out of the tubular stem and a nut thereon for applying pressure to expand the rubber collar and so expand the piston packing.

Signed by me this 28th day of May, 1909.

LEWIS AUGUSTUS ASPINWALL.

Witnesses:
C. G. RAWLEY,
GEO. N. WHITNEY.